United States Patent [19]
Bliss

[11] 4,300,671
[45] Nov. 17, 1981

[54] BAND SAW MACHINE

[76] Inventor: George N. Bliss, 1613 Emerald, Milton, Wash. 98354

[21] Appl. No.: 38,416

[22] Filed: May 11, 1979

Related U.S. Application Data

[62] Division of Ser. No. 825,703, Aug. 18, 1977, Pat. No. 4,170,912.

[51] Int. Cl.$^3$ .................... B65G 47/00; B23D 55/00
[52] U.S. Cl. .................................. 198/345; 83/416; 83/798; 83/800; 83/801; 269/86
[58] Field of Search ............... 83/796, 798, 800, 801, 83/416; 269/86; 198/345, 339, 344

[56] References Cited

U.S. PATENT DOCUMENTS

| | | | |
|---|---|---|---|
| 2,556,670 | 6/1951 | Ashworth | 83/798 |
| 2,594,548 | 4/1952 | Flick | 83/416 |
| 2,898,669 | 8/1959 | Crane et al. | 83/800 |
| 3,504,585 | 4/1970 | Harris | 83/801 X |

*Primary Examiner*—Donald R. Schran

*Attorney, Agent, or Firm*—Seed, Berry, Vernon & Baynham

[57] ABSTRACT

A band saw machine is provided with a cutting head that carries the endless saw blade. The cutting head can be swung from a vertical cutting plane into a horizontal cutting plane. Limits can be made in the feeding stroke of the cut and the return travel. A workpiece feeding and clamping vice is rotated about a horizontal axis. The combined positioning capability of the band saw blade and the workpiece vice allows difficult compound angular cuts to be made in the workpiece. The endless run of the blade is angled upwardly and outwardly away from the workpiece to provide additional clearance for cutting deep workpieces. Powered feed rolls advance the workpiece against a gauging stop to determine a predetermined length to be cut. The vice is then closed to hold the workpiece during cutting. Supplemental supports hold the rearward end of the workpiece during feeding and cutting. Blade guides are spaced for accomodating both small and large width blades.

7 Claims, 13 Drawing Figures

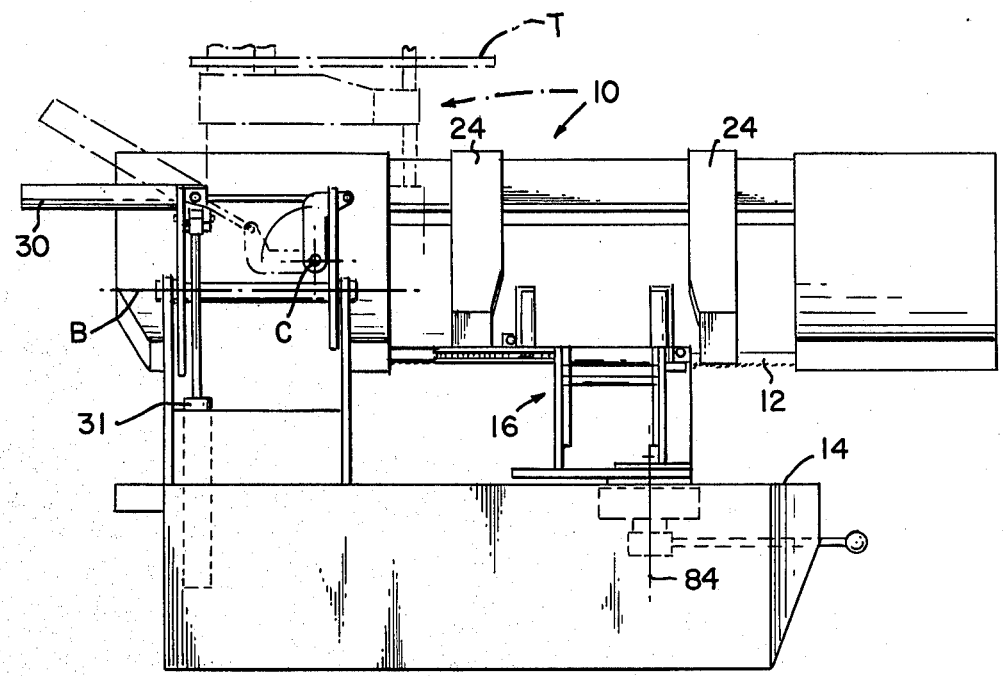
FIG. 4
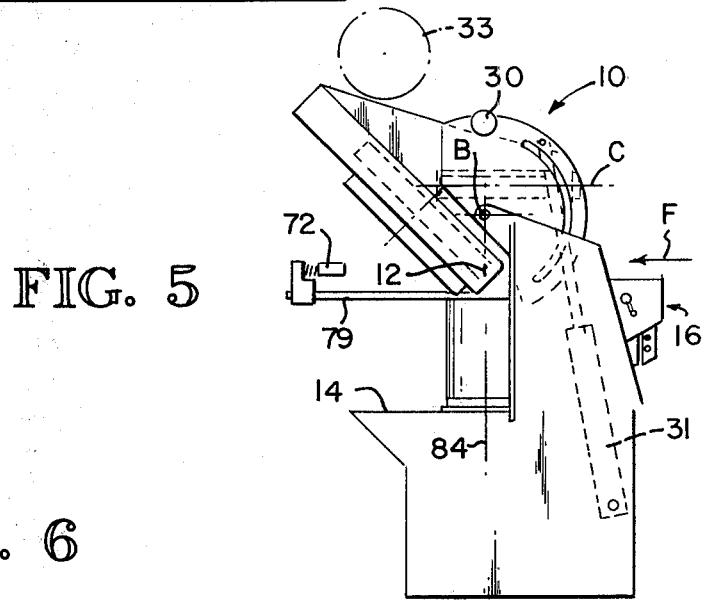
FIG. 5
FIG. 6
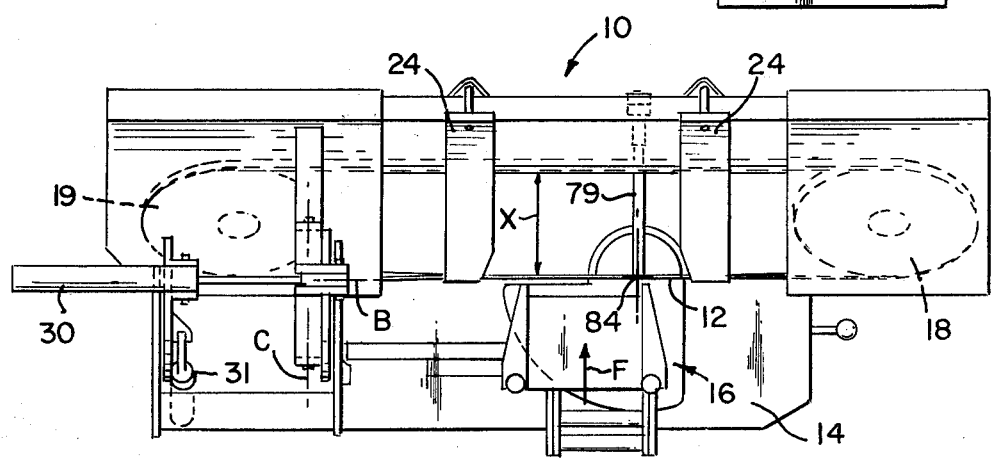

FIG. 7
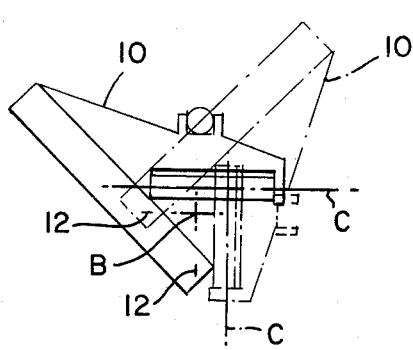
FIG. 8
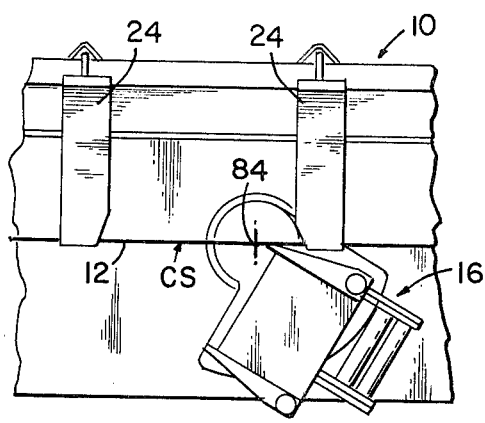
FIG. 9
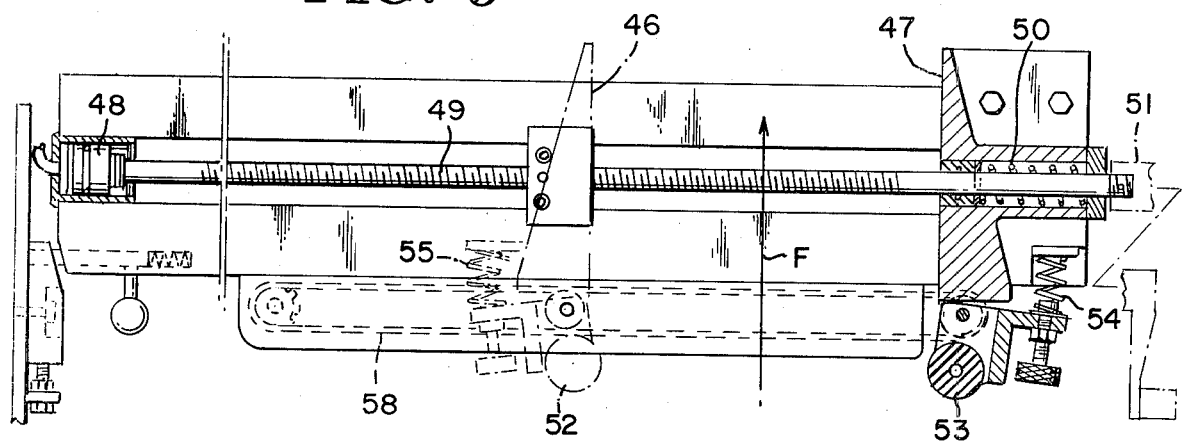
FIG. 11
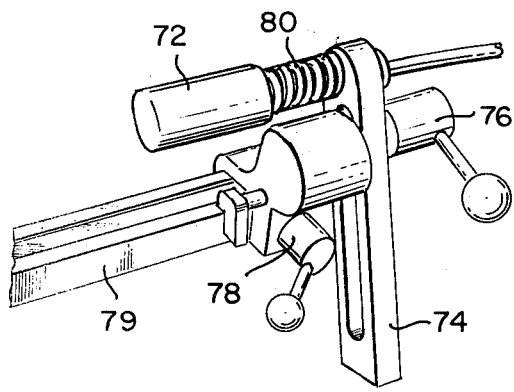
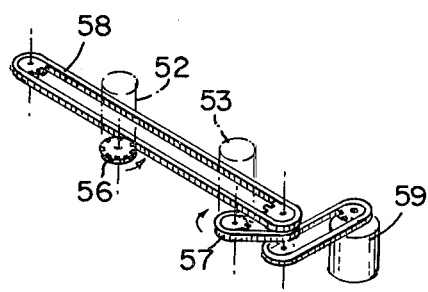
FIG. 10

BAND SAW MACHINE

This is a division, of application Ser. No. 825,703, filed Aug. 18, 1977 now U.S. Pat. No. 4,170,912.

BACKGROUND OF THE INVENTION

1. Field of the Invention

This invention pertains to band saw machines and more particularly to machines for cutting difficult compound angle cuts repeatedly from workpieces.

2. Description of the Prior Art

Band saw machines have heretofore been limited to cutting at 90° through workpieces or limited to highly complicated mechanisms if a compound angular cut was required. In addition, in general, only extremely sophisticated automated band saw machines were capable of providing any form of automatic feeding of the workpiece where multiple workpieces of the same length were desired.

SUMMARY OF THE INVENTION

It is an object of this invention to provide an easily manipulated band saw machine capable of making compound angular cuts in a workpiece.

It is another object of this invention to provide a band saw machine capable of cutting both in a horizontal and a vertical plane as well as all angles in between.

It is another object of this invention to provide a workpiece feeding and clamping vice which will advance a workpiece automatically and stop the workpiece at a predetermined position for repeatedly cutting the same length parts from a workpiece.

It is still another object of this invention to provide a vice which can be pivoted in relationship to the angular alignment of the band saw blade for providing compound angular cuts in a workpiece.

It is still another object of this invention to provide a band saw blade guide mechanism which can accomodate blades of various widths.

Basically these objects are obtained in various features of the band saw machine. The total combination of features, in addition, provides a unique highly versitile band saw machine capable of performing numerous functions heretofore available only through multiple machines. Such a machine is extremely desirable for use in machine shops where difficult compound angular cuts are required in multiple pieces but where the ultimate repeatability of the cut pieces is insufficient to warrant extremely expensive and complicated automatic cutoff machines. The band saw can also be used as a standard vertically travelling saw with the addition of a table attachment for customary cutting work. The machine can make standard vertical cuts for use as a bar cutoff machine. Still further, however, the machine can be used uniquely for making any form of partial or through compound angular cut. With the unique self-feeding and clamping vice an elongated workpiece can be advanced automatically to a predetermined stop or gauge position for repeating several cuts of the same length. The feeding and cutting can be totally automatically controlled such that the operator need only insert the workpiece into the vice and feeding and cutting repeatedly will be performed automatically. Alternatively, the machine can be operated manually or in between modes of fully automated and fully manually. Since is desirable frequently to change the size of the blade in the saw the unique blade guides reduce the amount of time necessary to make a changeover since the blades accommodate various sizes of saw blades.

Basically the compound angular cuts are accomplished by mounting the saw blade in a cutting head which can pivot firstly through a plane parallel to the cutting plane of the blade for making the cut but which can also pivot the cutting blade plane from vertical to any angle to the horizontal. This can be accomplished hydraulically or manually with great ease. The workpiece vice is also mounted for pivotal action about a horizontal axis so that it can present the workpiece at an angle to any of the saw blade cutting planes between horizontal and vertical. This provides the availability of making compound angular cuts. The cuts can be terminated either automatically by stops built into the control of the machine or manually. The return travel of the blade can also be limited automatically so that production rate can be increased by eliminating unnecessary travel time.

Basically the unique vice for clamping and feeding the workpiece includes a pair of opposed clamping surfaces and a set of driven workpiece driving rolls. The rolls are spring biased inwardly of the workpiece clamping surfaces so that they engage the workpiece in advance of the surfaces. Supplementary rollers are provided above and below the workpiece to the rear of the vice for supporting the rearward end of the workpiece as it is being advanced. In addition, spacers can be placed in the vice for raising the elevation of the workpiece in the vice for cutting workpieces of a thin depth. The supplementary rollers at the rear of the vice are also adjustable to maintain alignment with the spacers. The clamping surfaces can be adjusted on a rough basis for various size workpieces and finally after advancing the workpiece the clamping surfaces are automatically brought tightly together against the workpiece for holding the workpiece during cutting. The workpiece can be moved and automatically abutted against an end gauge which is set at a predetermined position to bring the advanced workpiece to its position necessary for the desired cutting length. The vice uniquely rotates about a forward end of one of the clamping surfaces so that it can be swung rearwardly to avoid interference between the opposite workpiece clamping surface and the saw blade. The plane of the complete run of the saw blade is also angled forwardly and upwardly from the vice so that its non-cutting return run does not interfere with the vice or the workpiece. For short parts to be cut off, for example, the return run will miss the end of the cutoff part allowing extremely deep workpieces to be cut.

The blade guides are adjustable along the cutting run of the saw blade for various parts and also are provided with different size recesses to accommodate saw blades of different thicknesses.

BRIEF DESCRIPTION OF THE FIGURES OF THE DRAWINGS

FIG. 4 is a rear elevation of the band saw machine.

FIG. 5 is an end elevation of the band saw machine.

FIG. 6 is a top plan of the band saw machine.

FIG. 7 is a schematic view of the cutting head of the machine looking from the same direction as FIG. 5, namely an end view, illustrating the angular positioning of the band saw blade from vertical cutting plane to a horizontal cutting plane.

FIG. 8 is a schematic illustration of the vice showing its pivotal orientation about a vertical axis and in relation to the cutting plane of the saw blade.

FIG. 9 is a fragmentary horizontal section of the vice shown in FIG. 3.

FIG. 10 is a schematic illustration of the drive for the workpiece advancing rollers shown in FIG. 9.

FIG. 11 is a fragmentary isometric of a workpiece gauge or feed stop embodying the principles of the invention.

FIG. 12 is a section taken along line 12—12 of the band saw guide shown in FIG. 13.

FIG. 13 is a fragmentary front elevation of a unique band saw guide.

DETAILED DESCRIPTION OF THE PREFERRED EMBODIMENTS

Figure 1:
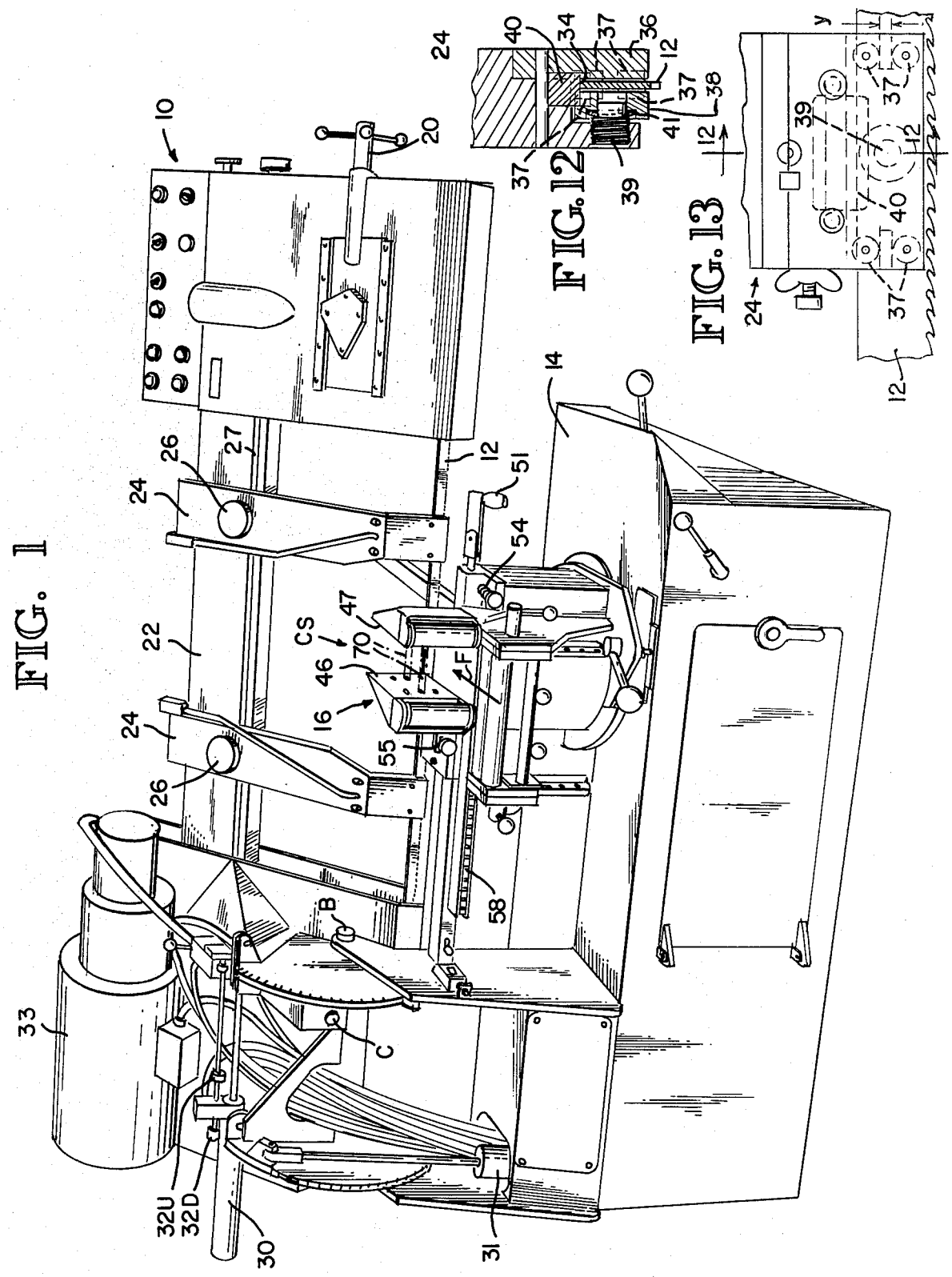
FIG. 1 is a perspective of a band saw machine embodying the principles of the invention.
Figure 2:
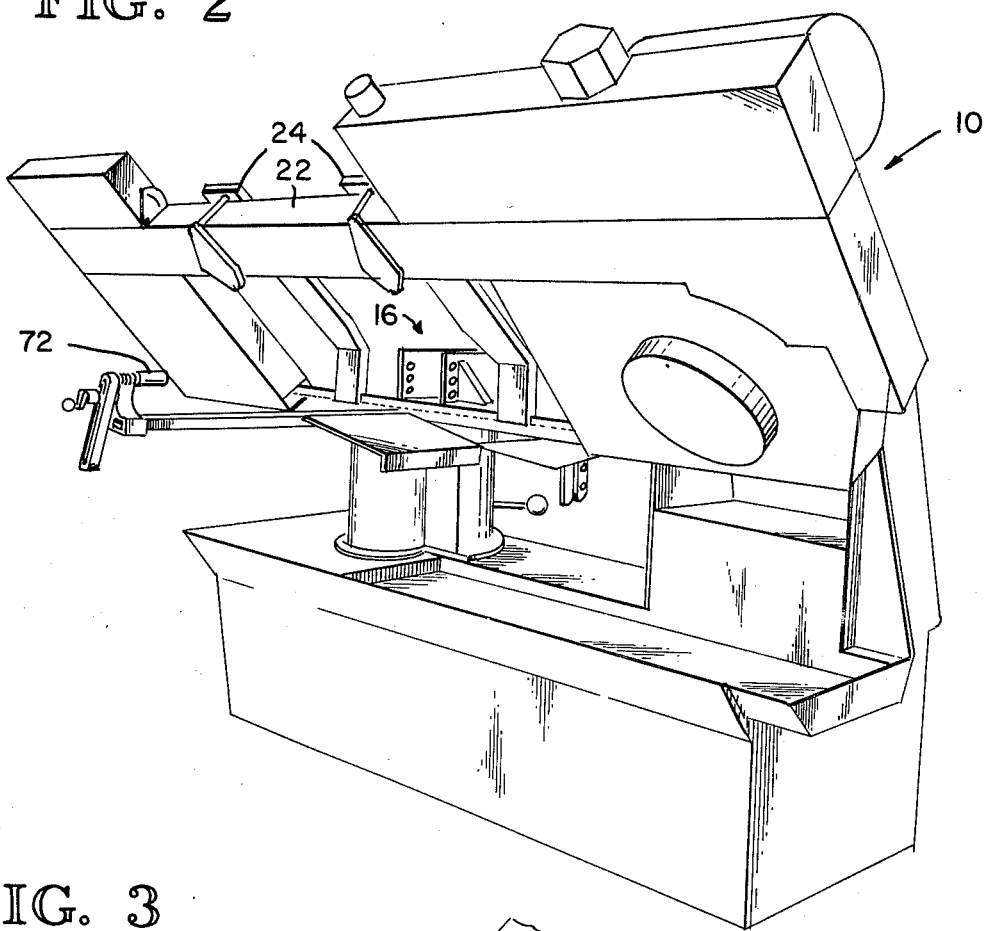
FIG. 2 is a perspective of the band saw machine looking in at the front of the machine.
Figure 3:
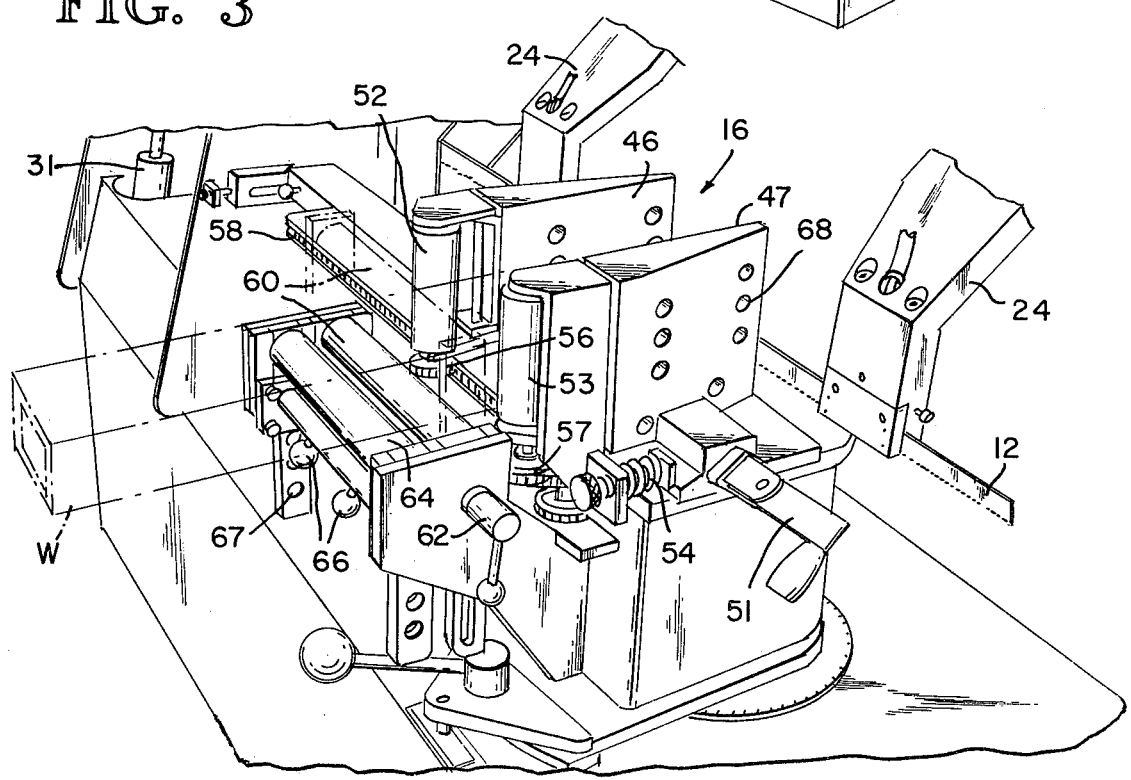
FIG. 3 is a perspective of a vice forming a part of the machine and as viewed from the rear of the vice.

The band saw machine as best shown in FIG. 1 includes a cutting head 10 which carries a conventional endless band saw blade 12. The head 10 is pivotally mounted about an axis C for moving the blade 12 through the work at a cutting station CS. The cutting head is pivotally mounted also about an axis B for pivoting the entire head from the vertical cutting position as shown in FIG. 1 to a horizontal cutting position as shown in phantom lines in FIG. 7. The pivot axis B is fixed on a base 14. The base 14 also supports a workpiece clamping and advancing vice 16. Work held in the vice 16 is advanced into the cutting station CS and the band saw stroked about the axis C to cut pieces from the workpiece.

CUTTING HEAD

The cutting head 10 includes a pair of guide wheels 18 and 19 (FIG. 6) over which the saw blade 12 is entrained. The distance between the wheels can be adjusted for tensioning the belt by a conventional adjustment 20. The structure supporting the wheels 18 and 19 is joined by a bar 22 on which are slidably mounted a pair of blade guides 24. The blade guides are adjustable relative to one another for supporting the blade in close proximity to the workpieces of various sizes. The blade guides each have a clamp screw 26 which rides in a track 27 for locking the guide in its set position. As is well understood the portion of the blade 12 in the cutting station CS will be at an angle from the plane of the blade as it passes over the wheels as is conventional practice.

It is a unique feature of this machine that the plane of the endless blade as determined by the two guide wheels 18 and 19 extends forwardly and upwardly of the vice 16 in the direction of work advance as indicated by the arrow F in FIG. 5. This provides the advantage that for short parts to be cut from a workpiece in the vice 16 which short parts do not extend from the vice beyond a distance X (FIG. 6) the height of the workpiece which can be cut is considerably greater than if the angle of the plane of the wheels 18 and 19 was rearwardly and upwardly inclined as in conventional band saw machines. That is, the workpiece can extend above the bar 22 and still be cut by the blade as long as the end of the workpiece does not extend beyond the distance X.

The head 10 is pivoted about the axis C in a conventional manner. It is a unique feature of this machine, however, that the head (including the axis C) is mounted for additional pivotal movement about the axis B. The two extreme positions of angular movement are shown in solid (vertical cut) and phantom (horizontal cut) positions in FIG. 7. This enables the band saw to be used as shown in FIG. 1 for conventional vertical cutoff or to be moved to an upright position for making horizontal cuts. In addition, as best shown in FIG. 4 the head 10 can be pivoted about the axis C into a vertical position as shown in phantom lines in FIG. 4 and a table T can be attached in a conventional way to convert the band saw machine to a normal upright, vertical cutting plane saw customarily found in machine shops.

Pivoting of the cutting head about the axis C can be accomplished manually or by an hydraulic cylinder 30. Similarly, pivoting of the cutting head 10 about the axis B can be manually or by hydraulic cylinder 31. Pivoting about axis C can be controlled automatically or manually by a pair of stops 32U and 32D. The stop 32D limits downward travel of the head to limit the depth of cut or limit the excessive travel after a through-cut. Similarly, stop 32U will limit the upward travel when the band saw blade is being returned from a cut to reduce time to begin the next engagement with the workpiece. These stops can be hydraulic valves for automatic operation or merely adjustable stops for manual operation.

A conventional-belt driven electric motor 33 drives the belt at a variable speed of from zero to 500 feet per minute.

BLADE GUIDES

The unique blade guides of this invention accommodate both standard one inch wide blades and standard ⅜ of an inch blades. Customarily the ⅜ inch blade will be used when the cutting head is rotated into the phantom line position of FIG. 4 and an attached workpiece supporting table is added. This blade is then used in this condition for cutting small or sharp angled cuts in a workpiece. To provide for the two blade sizes without the use of an adapter or the like each blade guide 24 is provided with a recess 34 (FIG. 12) which houses a stationary plate 36 and a floating plate 38. On each plate are four spaced carbide buttons 37. The floating plate 38 is slidably mounted on a bolt 39 that is threaded into the frame of the guide 24 and is pressed toward the stationary plate by a conventional belleville spring 41. As is best shown in FIG. 13 the gap y between each set of buttons 37 is wide enough to accommodate the passage of the teeth of the ⅜ inch wide blade. When a one inch wide blade is used, all eight buttons are in engagement with the side surfaces of the blade to guide it against lateral movement. When a ⅜ inch wide blade is used only the two innermost sets of buttons are used. In the case of both blades a carbide pad 40 running the length of the recess 37 provides backup pressure for the cutting force of the blade. The carbide pads are flushed during cutting in both of the blade guides 24 by conventional coolant. For the leading blade guide a conventional cutting coolant is used, whereas for the downstream blade guide, a conventional wash coolant for chip removal is used. The carbide pads can be replaced individually or collectively for a fraction of the cost of larger side plates as is customarily employed. Thus, while increasing the versatility of the machine to accommodate two blade sizes the replacement cost of the carbide blade guides is also substantially reduced.

WORKPIECE CLAMPING AND ADVANCING VICE

The workpiece clamping and advancing vice 16 includes a pair of clamping surfaces 46 and 47 each having forward ends and rearward ends in the direction of workpiece movement F. Surface 46 is on a movable member which tracks on an elongated threaded screw 49 which is rotated either by powered means or a handle 51. Rotation of the handle causes the clamping surface 46 to travel toward or away from a stationary clamping surface 47. In addition the screw is provided with a piston 48 which pressurized fluid causes the screw to shift a limited distance to the right, as viewed in FIG. 9 to positively clamp the surfaces 46, 47 against the workpiece to hold the workpiece during cutting. A spring 50 restores the movable surface 46 to its expanded position when the pressure on the piston is relieved.

At the rearward ends of the clamping surfaces 46 and 47 are provided a pair of rollers 52 and 53 each of which is adjustably pressed inwardly of its respective clamping surface by springs 54 and 55. The rollers are fixed to sprockets 56 and 57 which are rotated by chain drives 58 and a motor 59. The chain drives cause the rollers to be rotated simultaneously in opposite directions to feed a workpiece past the clamping surfaces in the direction F. The sprocket 52 walks along the chain 58 when the clamping surface 46 is either adjusted for a rough adjustment by the handle 51 or for clamping adjustment by the piston 48.

To the rear of the feed rollers 52 and 53 is a supplemental workpiece supporting mechanism which includes an upper rotatable roller 60, that is, adjustably mounted to be placed on the top of the workpiece and clamped in that position by a cam lock 62. A lower supporting roller 64 rotatably carries the bottom surface of the workpiece as it is passed through the vice. The lower roller 64 can be raised and held in place by a pair of detents 66 for carrying smaller depth workpieces higher in the vice. The detent holes 67 for the various positions are premeasured to correspond to holes 68 which accommodate spacer pins 70 shown in phantom in FIG. 1. Thus the workpiece will be held from above by roller 60 and supported below by rotatable roller 64 and spacer pins 70 for smaller size pieces. Obviously, if the depth of the piece is sufficient the spacer pins are not employed.

Forward of the vice 16 is a workpiece end gauge or stop 72. The stop is mounted on a bracket 74 which can be rotated or moved laterally into the path of the workpiece and held there by a cam clamp 76. Similarly, the distance of the stop from the forward end of the vice is determined by a second sliding clamp 78 that rides on a gauge bar 79 which has premeasured scale marks. The stop is connected to a micro-switch 80 which can automatically stop the motor 59 when the workpiece is advanced to the predetermined distance from the front of the vice. Thus for repeatability of cutting several parts of the same size the gauge is set and the workpiece fed until it engages the stop and the motor 59 is halted. Cutting then takes place and the machine can be automatically or manually cycled to again advance the workpiece until it again hits the stop. The cycling of the machine can, of course, be done manually once the workpiece engages the stop.

It is another important feature of this invention that the vice 16 pivots about a vertical axis 84. The axis is uniquely located just forward of the clamping surface 47 and is swung counterclockwise, as viewed in FIG. 8, so that both of the workpiece clamping surfaces 46 and 47 are moved away from an interfering position with the cutting blade. The rotation is preferably capable of about 75° and can accommodate essentially all compound angular cuts. Cuts which cannot be made in this position can be accomplished by turning the workpiece over 180°.

OPERATION

The detailed operation of the machine is now readily apparent. For use in cutting numerous pieces of the same length from an elongated workpiece, the workpiece is held on a supplementary table, not shown and fed through the vice 16 being held adjacent to the vice by the rollers 64 and 60. The driven rollers 52 and 53 feed the workpiece until it engages the gauge stop 72. At this time the feed rollers stop and the piston 48 moves the clamping surfaces 46 and 47 together to tightly hold the workpiece. The vice is preferably already positioned at its desired angular orientation and the cutting head rotated about the axis C to the limit of the stop 32D to make a cut. The blade is then pivoted back about the axis C until it reaches the desired up position determined by the stop 32U. Then the piece will have fallen free and the workpiece is again advanced into engagement with the stop 72 and the cutting cycle can be repeated. If the machine is to be used as a vertical cutting blade it is merely moved into the position shown in phantom in FIG. 4. The blade guides 24 can be varied in their spacing and with the angularity of the plane of the guide wheels 18 and 19 being upwardly and forwardly of the vice it can be seen that for short workpiece parts the diameter of the part cut can be increased substantially over the diameter for long parts which would be interfered with by the bar 22. In one example of the machine the normal cutoff diameter for long bars over 10 inches is 9½ inches in diameter but for parts less than 9 inches the cutting diameter is increased to 20 inches in diameter.

While variations in the invention will be obvious to one skilled in the art, it should be understood that the invention is not to be limited to the specific embodiments illustrated in the drawings.

I claim:

1. A workpiece clamping and feeding apparatus comprising:
   a pair of opposed clamping surfaces having forward and rearward ends,
   means for initially moving the clamping surfaces relative to one another for rough positioning of the clamping surfaces,
   power driven feed means adjacent and coupled to the clamping surfaces for advancing and positioning the workpiece for cutting, and
   final clamping surfaces moving means for moving the clamping surfaces relative to one another into final clamping engagement with the workpiece, said feed means including at least two opposed rollers, each adjacent a respective clamping surface, means rotating at least one of said rollers for advancing the workpiece, means pressing the rollers toward one another and beyond the clamping surfaces for engaging the workpiece independently of the clamping surfaces to advance the workpiece, said means pressing the rollers being retractable when said clamping surfaces engage the workpiece.

2. The apparatus of claim 1, including opposed, supplementary workpiece support members adjustably positioned above and below the workpiece rearward of the rearward ends of the clamping surfaces in the direction of workpiece advance for holding the workpiece above and below as it is fed between said clamping surfaces.

3. The apparatus of claim 1, including means for pivotally moving said clamping surfaces together rearwardly about a pivot adjacent a forward end of one of said clamping surfaces for changing the angle of the workpiece, and wherein said roller rotating means rotates both of said rollers simultaneously and each roller is located adjacent the rearward end of each clamping surface.

4. The apparatus of claim 1, said means for advancing and positioning the workpiece for cutting including gauge means for terminating such advancing movement of the workpiece, said gauge means including a gauging stop which engages the advance end of the workpiece.

5. A workpiece clamping and feeding apparatus comprising:
a pair of opposed clamping surfaces having rearward ends,
means for feeding work between said clamping surfaces to position the work,
means for clamping the surfaces together when said work is positioned, and
supplemental work holding means spaced rearwardly of said clamping surfaces in the direction of work feed and adjustable for engaging the work both from above and below to provide four-point holding of the work in combination with said clamping surfaces, said supplemental work holding means including a lower support bar and a vertically adjustable upper bar, said clamping surfaces positioned on either side of a horizontal work support platform, and including removable work support means positionable between said clamping surfaces to support the work above the platform, said lower support bar of said supplemental work holding means being vertically adjustable for supporting the work above said work support platform, said removable work support means being alignable with said rearward, vertically adjustable lower support bar for providing two spaced locations for supporting the work above said horizontal work support platform, and with said upper support bar holding said work from above.

6. A workpiece clamping and feeding apparatus comprising:
a pair of opposed clamping surfaces having forward and rearward ends,
means for initially moving the clamping surfaces relative to one another for rough positioning of the clamping surfaces,
power driven feed means adjacent the ends of the clamping surfaces for advancing the workpiece between the clamping surfaces,
gauging means for limiting such advance movement of the workpiece for positioning the workpiece for cutting, and
final clamping surfaces moving means for moving the clamping surfaces relative to one another into final clamping engagement with the workpiece, said feed means including a driven roller adjacent the rearward end of each clamping surface, means pressing the rollers toward one another and beyond the clamping surfaces for engaging the workpiece independently of the clamping surfaces to advance the workpiece, means for simultaneously rotating the rollers in opposite directions, said means pressing the rollers being retractable as said clamping surfaces engage the workpiece.

7. A workpiece clamping and feeding apparatus comprising:
a pair of opposed clamping surfaces having forward and rearward ends,
means for initially moving the clamping surfaces relative to one another for rough positioning of the clamping surfaces,
power driven feed means adjacent the ends of the clamping surfaces for advancing the workpiece between the clamping surfaces,
gauging means for limiting such advance movement of the workpiece for positioning the workpiece for cutting,
final clamping surfaces moving means for moving the clamping surfaces relative to one another into final clamping engagement with the workpiece,
opposed supplementary workpiece support members adjustably positioned above and below the workpiece rearward of the rearward ends of the clamping surfaces for supporting the workpiece as it is fed between said clamping surfaces, and
means for pivotally moving said clamping surfaces together rearwardly about a pivot adjacent a forward end of one of said clamping surfaces for changing the angle of the workpiece, and said feed means including a driven roller adjacent the rearward end of each clamping surface, means pressing the rollers toward one another and beyond the clamping surfaces for engaging the workpiece independently of the clamping surfaces to advance the workpiece, means for simultaneously rotating the rollers in opposite directions, said means pressing the rollers being retractable as said clamping surfaces engage the workpiece.

* * * * *